United States Patent Office 2,794,704
Patented June 4, 1957

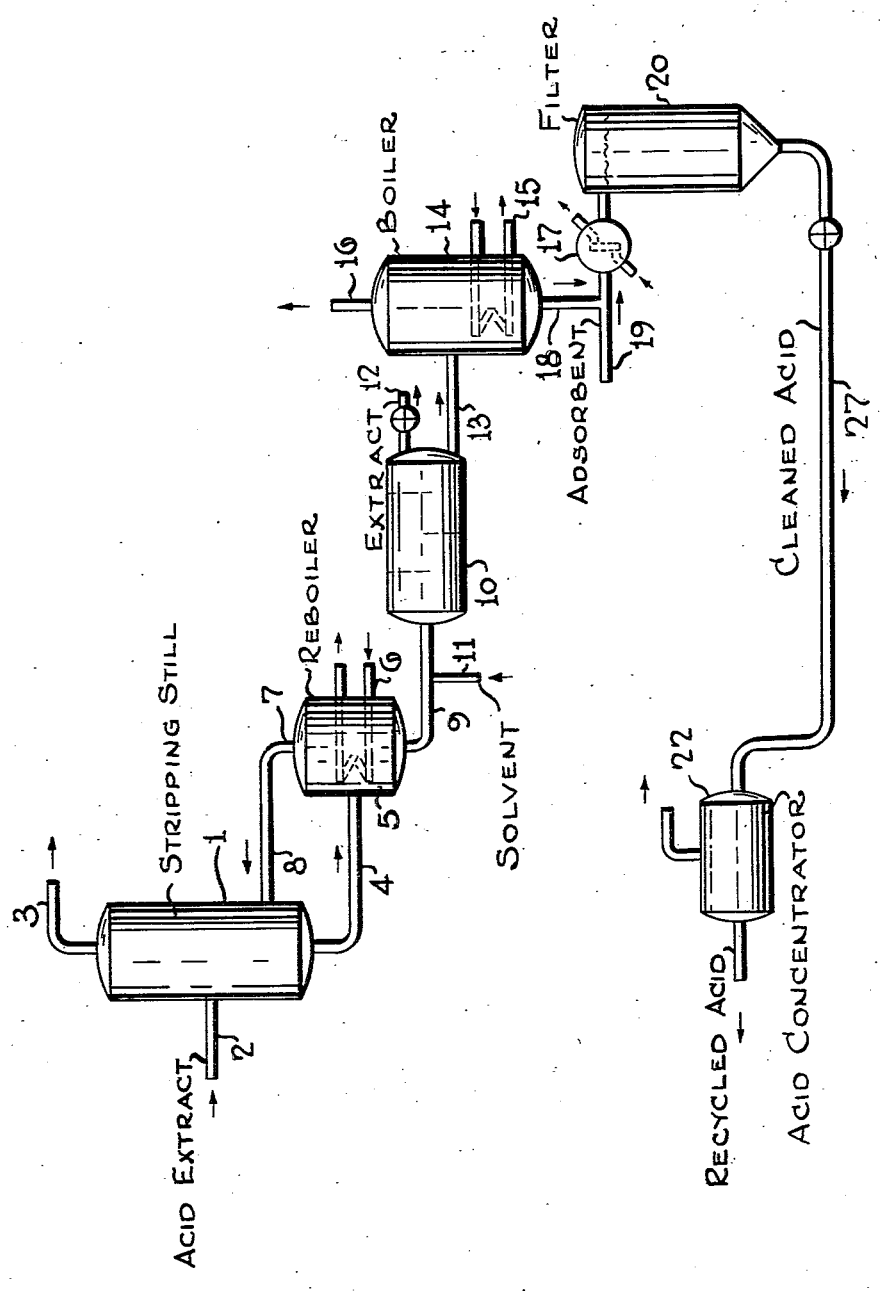

2,794,704

TREATMENT OF SPENT SULFURIC ACID

Henry C. Paulsen and Joseph W. Dowling, Elizabeth, N. J., assignors to Esso Research and Engineering Company, a corporation of Delaware Application March 19, 1954, Serial No. 417,308

3 Claims. (Cl. 23—172)

This invention relates to decarbonization and decolorization of spent sulfuric acid, particularly such spent acid recovered in the production of aliphatic alcohols by hydrolysis of sulfuric acid-olefin extractions.

The need for improved purification treatment of spent sulfuric acid is well described in U. S. Patent 2,553,407 of Epps et al. which describes the use of powdered adsorbents together with a hydrocarbon oil. Another kind of spent sulfuric acid treatment is described in U. S. Patent 2,304,280 of C. L. Read, which shows the use of phenolic solvents and hydrocarbon oil.

The present application is a C. I. P. of application, Serial Number 189,084 filed October 9, 1950, now abandoned, which points out advantages of using solid adsorbents, provided they are used in a step which follows the use of an organic solvent extraction of the spent acid.

According to the present invention, the spent sulfuric acid which is to be decarbonized and decolorized is, in general, a hydrolyzed acid extract formed in stripping aliphatic alcohols therefrom under steam distillation conditions which leave the residual spent aqueous acid containing approximately 40 to 60 weight percent $H_2SO_4$. A small portion of unsaturated hydrocarbon in the initial acid extract is converted to materials which form tars, resins and free carbon when the acid extract is subjected to high temperatures needed to separate the crude alcohol from the acid. These carbonaceous materials must be removed as much as possible to make the acid reconcentration equipment operate at a high service factor.

According to the present invention the spent sulfuric acid containing carbonaceous impurities is treated by a combination of steps. Preferably, the spent acid is treated with an admixed organic solvent for soluble carbonaceous tars and resins, the solvent being preferably a phenolic solvent. Secondly, after the aqueous acid is separated from the solvent and extract, it is heated to an elevated temperature preferably near its boiling temperature. Thirdly, the boiled dilute aqueous sulfuric acid is contacted with a solid sorbent material and filtered therefrom to complete the clean-up. The sulfuric acid filtrate thus obtained is satisfactorily colorless, and satisfactorily free of carbonaceous material for reconcentrating and reuse.

It has been found that solvent extraction of the spent acid, treatment by sorbent material or combination of solvent extraction with sorbent treatments are not as effective as desired for removal of contaminants from the spent acid. The solid adsorbents are inefficient when the spent acid is contaminated by high concentrations of organic contaminants, especially tarry and resinous contaminants. It has now been found important to precede the solid sorbent treatment with steps for eliminating resins or liquid organic substances; thus, it has been found dseirable to use the prior solvent extraction followed by the heat treatment and to avoid having oily organic materials present in carrying out the sorbent treatment or filtration.

The solvent employed in the extraction step may be an acid-insoluble phenolic type solvent including phenol itself, substituted or alkylated phenols, e. g. xylols and cresols, petroleum phenols and petroleum phenol mixtures with naphthenic acids. Such mixtures richer in phenols are preferred together with the phenol solvent or as a subsequent step other organic solvents may be used, e. g. hydrocarbon oil solvents. The solvent extraction is capable of removing from the dilute aqueous acid some of the contaminants such as sulfonates, tarry and asphaltic compounds, some resins, etc. However, the aqueous acid following separation from the solvent and extract will tend to contain some dissolved carbonaceous materials. When the solvent treated dilute aqueous acid is heated to a boiling temperature of the order of 230° to 285° F., some of the volatile carbonaceous materials can be expelled but advantageously carbonaceous contaminants remaining in the acid are converted to a better filterable form.

The solid sorbent contact material to be used in treating the extracted and heat treated spent acid may be selected from a wide number of acid-resistant materials including clays, such as Attapulgus, Super-Filtrol, floridin, fuller's earth or similar bleaching clay. Suitable clays include naturally active clays and the acid treated clays of the bentonite type. In addition to clays, other solid adsorbents are suitable, such as activated carbons, alumina, bauxite, diatomaceous earths, kieselguhr, etc.

The drawing represents a flow plan of preferred mode of operation. In the drawing, the crude hydrolyzed sulfuric acid-olefin extract is supplied to the stripping still 1 from line 2, the aqueous alcohol is distilled overhead for removal by line 3. The spent aqueous sulfuric acid in the range of 40 to 60% strength is withdrawn as bottoms by line 4 to reboiler 5 provided with a heating coil 6. Vapors are returned to still 1 from reboiler 5 by lines 7 and 8. Residual bottoms from the reboiler are passed through line 9 to the extraction unit 10. Solvent, e. g. phenols or phenols and hydrocarbon oil are admixed by line 11. Separation is made to take place in the settling zone of the extraction unit 10 so that the solvent extract can be withdrawn as an upper phase through line 12 and the acid raffinate can be withdrawn as the lower phase through line 13. The solvent treated acid from the extraction zone is passed through line 13 into a boiler 14 provided with a heating coil 15. Vapors are removed from the boiler 14 overhead by line 16. The boiled dilute aqueous acid is withdrawn through line 18 into a heat exchanger 17 for cooling prior to filtration. Adsorbent material, such as powdered clay or activated carbon or the like is admixed from line 19 and passed to a filtering means 20. The filtering treatment may be of the contact type or the filter may be a continuous rotary filter or any such equivalent means for separating the solid adsorbent requirement from the dilute aqueous acid. Dilute aqueous acid is withdrawn from the filtering unit 20 by line 27 for passage to storage or for reconcentration in vessel 22 after which the acid may be reused.

The following experiments demonstrated various phases of the process.

EXAMPLE 1

A spent aqueous sulfuric acid of 45.1 weight percent $H_2SO_4$ strength and containing impurities giving content of 1.89% to the acid was treated with petroleum phenols. About 6 volume percent of the solvent was used in treating the acid at 100° F. The solvent treatment removed only 59.8% of the carbonaceous material in terms of carbon content.

EXAMPLE 2

When the solvent treated acid raffinate obtained as in Example 1 was boiled the acid content increased slightly and the carbon removal increased to 71.5 weight percent.

EXAMPLE 3

After boiling the solvent treated spent acid for a period of 10 minutes at temperatures in the range of 240° to 260° F., the acid was mixed with various filtration agents. Super-Filtrol and 200 mesh Attapulgus clay were added to different batches in the amount of 10 weight percent. Each of the mixtures was agitated for a period of about 5 minutes which was sufficient time for good contact at 100° F., then filtered. The recovered filtrates were of satisfactory light color. The Super-Filtrol treated acid had 84.5% carbon removed and was clear white. The Attapulgus clay treated acid had 81.5 weight percent carbon removed and was a clear pale yellow. The recovery of acid was 95.4 to 96 weight percent respectively.

It was found that the solvent treatments and the clay treatments could be carried out advantageously in the range of about 75° F. to 150° F.

EXAMPLE 4

A spent refinery sulfuric acid which contained 1.48 weight percent total carbon from organic impurities was first treated with 6 volume percent of phenol at 100° F. by agitation with the phenol for 3 minutes and settling in 15 minutes. After separating the phenol solvent containing extracted impurities, the recovered aqueous sulfuric acid was 99.8 volume percent.

Various treatments were imposed on the phenol solvent treated sulfuric acid raffinate, such as a subsequent filtration, a subsequent boiling and a subsequent boiling followed by a filtration. The filtration treatment was carried out by using activated acid sludge coke and percolating the aqueous sulfuric acid therethrough.

It was found and demonstrated that the boiling treatment had to be imposed after the extraction and between the extraction and the filtration in order to obtain the desired satisfactory carbon removal. This is illustrated in the following table:

Table

| Analyses of Sulfuric Acid | Wt. Percent Carbon | Percent Carbon Removed |
|---|---|---|
| Original Acid | 0.48 | |
| Extracted+Filtrations [1] | 0.63 | 57.4 |
| Extracted+Boiling | 0.48 | 67.6 |
| Extracted+Boiling+Filtrations [1] | 0.19 | 87.2 |

[1] Percolated through activated petroleum acid sludge coke.

It is to be understood that the treatment of the spent acid may be made to take place in any suitable mixing and separating apparatus. The solvent may even be admixed with the spent acid in the stripping still so that the usual reboiler may be used for the subsequent boiling step.

The contacting of the solvent-treated acid with solid sorbent material may take place in any of the conventional ways, the mixture of acid solids is agitated and then filtered through a suitable filtering device or the acid is percolated through a bed of the finely divided solid adsorbent material.

Suitable operating conditions are summarized in the following table:

| | Range of Operating Conditions |
|---|---|
| Solvent Extraction: | |
| 1. Temperature | 50 to 100° F. (Avg. 80° F.). |
| 2. Solvent Treat | 5 to 50 Vol. Percent (Avg. 10 Vol. Percent). |
| 3. Contact Time | 3 to 10 Minutes (Avg. 5 Min.). |
| 4. Setting Time | 5 to 45 Minutes (Avg. 15 Min.). |
| Boiling of Raffinate (Solvent Extracted Acid): | |
| 1. Percent $H_2SO_4$ in Raffinate | 40 to 55 Wt. Percent (Avg. 45 Wt. Percent). |
| 2. Boiling Temperature | 230 to 285° F. (Avg. 250° F.). |
| 3. Boiling Time | 5 to 30 Minutes (Avg. 15 Min.). |
| Filtration: | |
| 1. Temperature | 50 to 180° F. (Avg. 100° F.). |
| 2. Filter Agent | 2 to 10 Gallons 45 Wt. Percent $H_2SO_4$. Per Pound filtering clays or charcoal. |

It is to be understood that in the operations described the solvent used may be any liquid capable of extracting such carbonaceous substances as are soluble in phenols or the like. The boiling step is a heat treatment for vaporizing organic substances that remain in the acid after the solvent extraction; including even the organic solvent. The boiling step is essentially used after the treatment with the solvent materials so that a negligible amount of such organic substances will be present when the acid is contacted with the solid absorbent.

What is claimed is:

1. A process for purifying spent aqueous sulfuric acid of approximately 40 to 60 weight percent $H_2SO_4$ contaminated with a small amount of carbonaceous material which comprises treating the spent aqueous acid with a phenolic solvent to extract from the acid dissolved carbonaceous impurities, removing the solvent containing extracted impurities, heating the separated acid containing the remaining unextracted impurities to a boiling temperature to strip out volatile organic impurities therefrom, then contacting the boiled aqueous spent acid with a solid sorbent material to remove further amounts of carbonaceous impurities therefrom and separating resulting purified aqueous acid from the solid adsorbent.

2. The process defined by claim 1, in which the spent acid is treated with the phenolic solvent to extract said carbonaceous impurities, after which the acid, separated from said solvent and extract, is heated to temperatures in the range of 230° to 285° F. to boil out volatilized organic impurities before the acid is then treated with the solid sorbent.

3. The process of purifying spent aqueous sulfuric acid of 40 to 60 weight percent $H_2SO_4$ containing relatively small amounts of carbonaceous impurities, which comprises first treating said spent acid with an admixed phenolic solvent for soluble carbonaceous tars and resins among said impurities, separating the thus treated aqueous acid from said solvent and from impurities extracted by the solvent, subsequently heating the aqueous acid separated from said solvent and extracted impurities to an elevated temperature in the range of 230° F. to 285° F. for a period of 5 to 30 minutes, during said heating removing organic impurities which are boiled from the aqueous acid, then filtering the acid after said heating by contact with the solid adsorbent material at a temperature in the range of 50° to 180° F. in order to remove remaining impurities which remain unvolatilized in the acid.

References Cited in the file of this patent

UNITED STATES PATENTS

| | | |
|---|---|---|
| 2,304,280 | Read | Dec. 8, 1942 |
| 2,530,953 | Fuqua | Nov. 21, 1950 |
| 2,553,407 | Epps et al. | May 15, 1951 |